United States Patent
Khanna et al.

(10) Patent No.: US 11,252,157 B1
(45) Date of Patent: Feb. 15, 2022

(54) PERMISSION MANAGEMENT FOR ELECTRONIC RESOURCES

(71) Applicant: Amazon Technologies, Inc., Reno, NV (US)

(72) Inventors: Gaurav Khanna, Bellevue, WA (US); Yunqi Wang, Lynwood, WA (US); Ajith Harshana Ranabahu, Bothell, WA (US); Ajay Narang, Seattle, WA (US); Ruiyang Ding, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 149 days.

(21) Appl. No.: 16/817,031

(22) Filed: Mar. 12, 2020

(51) Int. Cl.
*G06F 15/16* (2006.01)
*H04L 29/06* (2006.01)
*G06F 9/455* (2018.01)

(52) U.S. Cl.
CPC .......... *H04L 63/10* (2013.01); *G06F 9/45558* (2013.01); *H04L 63/08* (2013.01); *G06F 2009/45595* (2013.01)

(58) Field of Classification Search
CPC ..... H04L 63/10; H04L 63/08; G06F 9/45558; G06F 2009/45595
USPC ................. 709/220, 224, 226, 228
See application file for complete search history.

(56) References Cited

U.S. PATENT DOCUMENTS

| | | | |
|---|---|---|---|
| 8,856,077 B1* | 10/2014 | Roth | G06F 9/5072 707/638 |
| 9,424,429 B1* | 8/2016 | Roth | G06F 21/604 |
| 9,531,607 B1* | 12/2016 | Pai | H04L 43/16 |
| 9,565,260 B2* | 2/2017 | Roth | G06F 11/3051 |
| 9,675,788 B2* | 6/2017 | Tarlow | B43K 27/08 |
| 10,250,612 B1* | 4/2019 | Raposa | H04L 63/108 |
| 10,389,905 B2* | 8/2019 | Shibahara | H04N 1/00708 |
| 2014/0298442 A1* | 10/2014 | Qureshi | H04L 63/0815 726/8 |
| 2018/0275765 A1* | 9/2018 | Roth | G06F 3/04812 |
| 2019/0182262 A1* | 6/2019 | Raposa | H04L 63/08 |

* cited by examiner

*Primary Examiner* — Khanh Q Dinh
(74) *Attorney, Agent, or Firm* — Hogan Lovells US LLP

(57) ABSTRACT

Various embodiments provide for a pre-validation of various aspects of an application deployment before any resources are provisioned in a user account. Pre-validation can perform checks on aspects such as connectivity and credential-based access for instances to be provisioned in a user account. A determination can also be made as to whether a role exists in the user account that has the appropriate policies and permissions to enable these instances, if provisioned, to have access to external services and resources needed to support the application. These checks can be performed through a launch wizard or deployment service that can collect information though a single console, and can ensure that these checks succeed before the requested instances are provisioned in the user account.

20 Claims, 10 Drawing Sheets

Resource Management Console

Application Launch Request

Application

App. name: Application X Primary ⟵ 302

App. type: SQL Server ABC123

Resource Provisioning Parameters

| | |
|---:|:---|
| Instance Type: | AA.Large |
| Domain Username: | UsernameABC |
| Domain Password: | ABC123 |
| Private Subnet ID: | subnet-ab2 |
| Public Subnet ID: | subnet-x10 |
| SQL Server Version: | 2020 |
| Volume Type: | VolumeAC |
| Volume IOPS: | 1000 |
| Volume Size: | 500 |
| Machine Image: | MachineImage12.2 |

⟵ 304

⋮  ⋮

[ Back ] [ Next ] [ Help ] ⟵ 306

FIG. 3

PERMISSION MANAGEMENT FOR ELECTRONIC RESOURCES

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

BRIEF DESCRIPTION OF THE DRAWINGS

Various embodiments in accordance with the present disclosure will be described with reference to the drawings, in which:

FIG. 3 illustrates an example console display that can be utilized in accordance with various embodiments.

DETAILED DESCRIPTION

Figure 1:
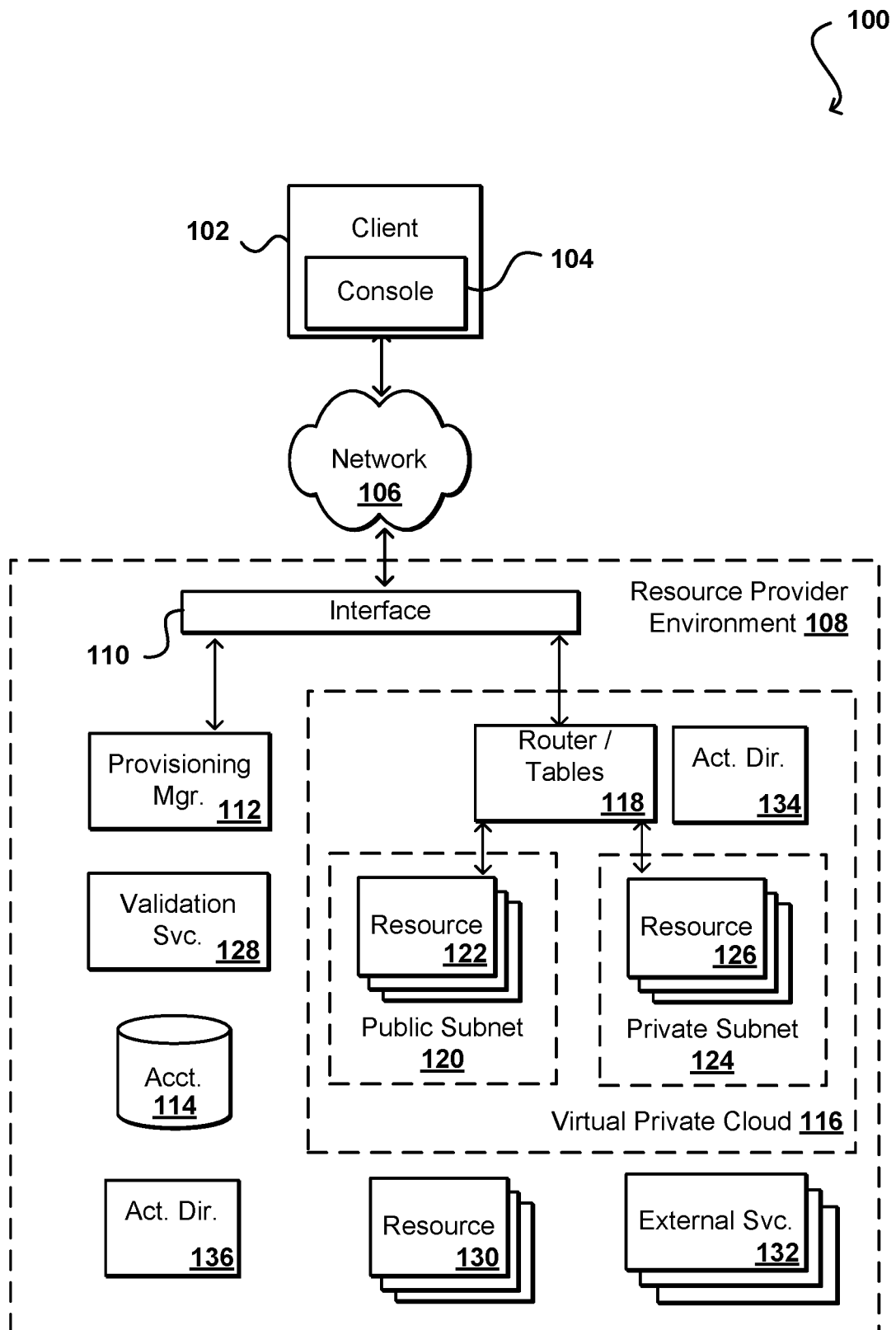
FIG. 1 illustrates an example system for providing cloud resources that can be utilized in accordance with various embodiments.

In many instances, cloud resources may be used to host specific applications, which require specific types of connectivity, configuration, and permissions. In many of these instances, determination of valid connectivity, configuration, and/or permissions is not done before those resources are provisioned, which can result in application errors as well as user costs for potentially improperly provisioned resources.

Systems and methods in accordance with various embodiments of the present disclosure overcome one or more of the aforementioned and other deficiencies experienced in conventional approaches to managing aspects of resource sharing and allocation in an electronic environment. In particular, various embodiments provide for the pre-validation of various aspects of a deployment before any resources are provisioned in a user account, avoiding erroneous deployments and saving costs both in terms of resource usage and user charges. In at least one embodiment, a pre-validation service can perform checks on aspects such as connectivity and credential-based access for compute instances to be provisioned in a user account. The pre-validation service can also perform a check to determine whether a role exists in the user account that has the appropriate policies and permissions to provide these instances, if provisioned, with the necessary access to external services and resources needed to support the application. The pre-validation service can be provided as part of a launch wizard or deployment service that can collect information from a user though a single console, and can ensure that these checks succeed before the requested resources are provisioned in the user account by using the pre-validation service in the resource launch workflow. Beneficially, this early failure detection mechanism can prevent the launch of resources that would ultimately fail, thereby preventing wasteful usage of cloud hardware for these resources, and preventing customers from incurring charges relating to these resources.

A launch wizard service that incorporates the disclosed pre-validation service can offer customers a guided way of sizing, configuring, and deploying their workloads, for example workloads such as self-managed high availability SQL Server solutions running in a virtualized computing service, without having to identify and provision individual cloud resources. With respect to the SQL Server example, customers can simply input their SQL Server requirements including performance, number of nodes, and connectivity in the console, and the launch wizard service can recommend the right cloud resources, such as compute instances and block storage volumes, to deploy the SQL Server application. The launch wizard service can also present customers with an estimated cost of deployment for these resources. Customers can have the ability to modify the recommended resources and instantly see an updated cost assessment in the console. Once the customer approves of the resources, the launch wizard service can automatically provision and configure them to create a production ready SQL Server Always On deployment. This can beneficially simplify application deployment, by allowing customers to simply input their requirements including performance, number of nodes, and connectivity in the console, and then providing the customer with recommended cloud resources, rather than asking customers to select separate infrastructure pieces. The launch wizard service and pre-validation service can be part of a control plane of a cloud provider network.

Various other applications, processes, and uses are presented below with respect to the various embodiments.

FIG. 1 illustrates an example system 100 that can enable a user to obtain access to resources provided as part of a resource provider environment 108. These resources can include physical and virtual resources that may be located at one or more locations controlled by the provider or a third party, or may be located on a location controlled by the user, or an entity with which the user is associated. In this example, a user can utilize a client device 102 to access resources of the resource provider environment 108 over one or more networks. The client device 102 can include any appropriate electronic device operable to send and receive requests, messages, or other such information over an appropriate network and convey information back to a user of the device. Examples of such client devices include personal computers, tablet computers, smart phones, notebook computers, and the like. The network(s) 106 can include any appropriate network, including an intranet, the Internet, a cellular network, a local area network (LAN), or any other such network or combination, and communication over the network can be enabled via wired and/or wireless connections. The resource provider environment 108 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

The resource provider environment 106 may be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network may implement various computing resources or services, which may include a virtual compute service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services (referred to in various implementations as cloud disks service, a managed disk service, a storage area network service, a persistent disk service, or a block volumes service), or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

In various embodiments, the resource provider environment 108 may include various types of electronic resources that can be utilized by multiple users for a variety of different purposes. In at least some embodiments, all or a portion of a given resource or set of resources might be allocated to a particular user or allocated for a particular task, for at least a determined period of time. This can include, for example, enabling a customer to launch one or more instance of one or more types of these resources. In at least one embodiment, a resource instance can include storage volumes, compute instances, and network interfaces, among other such options. This can include, for example, enabling a customer to launch one or more instance of one or more types of these resources. In at least one embodiment, a resource instance can include storage volumes, compute instances, and network interfaces, among other such options. The sharing of these multi-tenant resources from a provider environment is often referred to as resource sharing, Web services, or "cloud computing," among other such terms and depending upon the specific environment and/or implementation. In this example the provider environment includes a plurality of electronic resources 122, 126, 130 of one or more types. These types can include, for example, application servers operable to process instructions provided by a user or database servers operable to process data stored in one or more data stores in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

Figure 2:
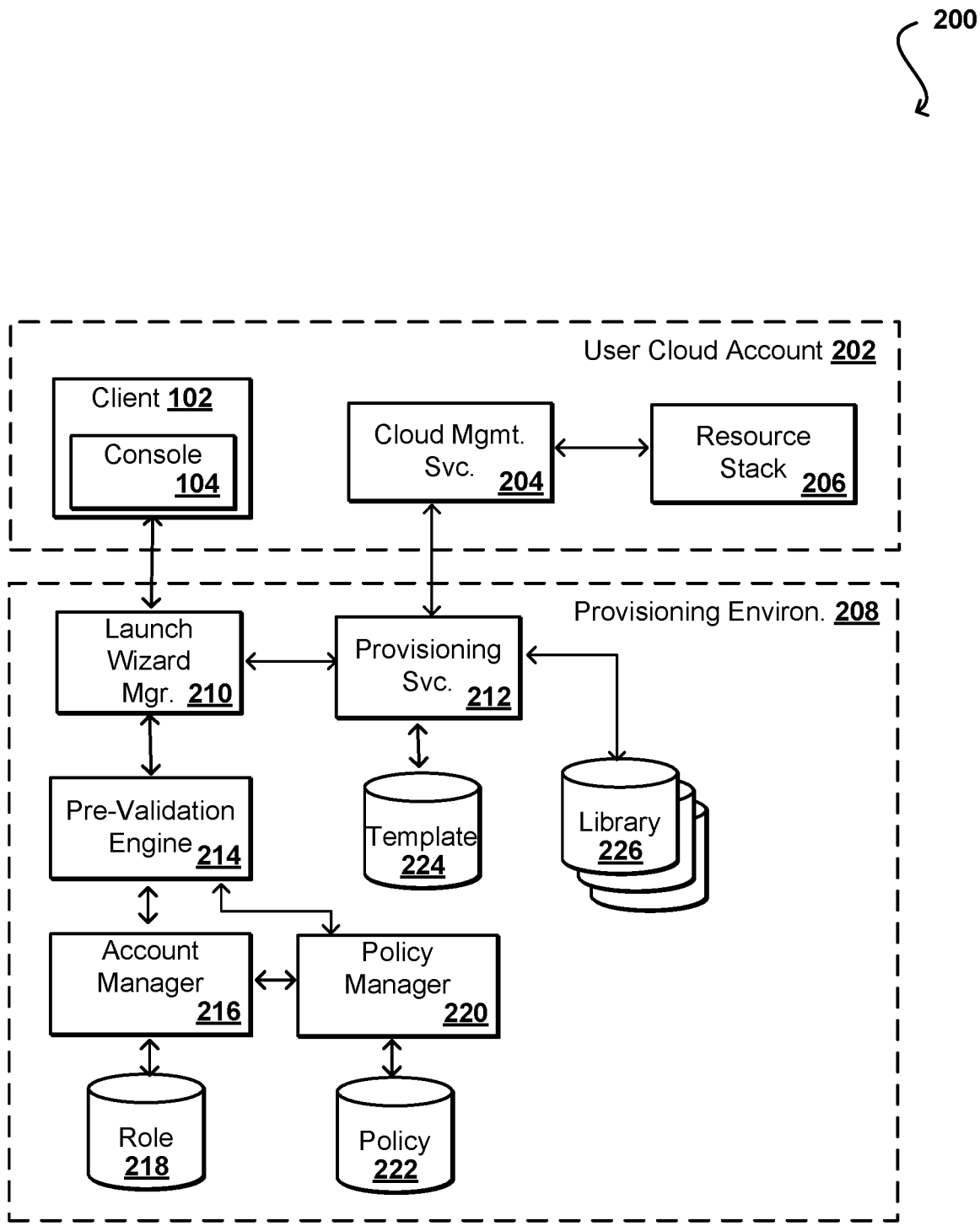
FIG. 2 illustrates an example system for provisioning resources in a user cloud account that can be utilized in accordance with various embodiments.

In this example, a user might request to have resources 122, 126 allocated in a specific logical sub-region of the resource provider environment, such as in a virtual private cloud 116. In at least some embodiments, one or more of these resources may be located in a user environment as well, as discussed in more detail elsewhere herein. Thus, in some embodiments the environment 108 may be considered a cloud environment where at least some of the resources are provided by a user or third party, but may in at least some embodiments be under control of, or accessible to, systems or services of the resource provider. At least some of these resources can also be logically located within a customer account, as illustrated and described with respect to FIG. 2. For example, active directory 134 may be located on premise at a user location but logically contained within the user VPC 116. A virtual private cloud (VPC) refers to a set of resources within the resource provider environment that are allocated to a specific user, customer, or entity that is logically isolated from resources allocated to users, customers, or entities not associated with that VPC. Even though a pool of resources might be shared among multiple VPCs, isolation for these resources 126 can be achieved in at least one embodiment through use of a private subnet 124 and a virtual communication construct, as may include one or more encrypted communication channels. In at least one embodiment, a VPC may also include resources 122 in a public subnet 120 that may provide a lesser amount of isolation. A request router 118 and set of routing tables can be used to direct requests received to the VPC to resources of the public or private subnet, as may be determined using an active directory 134, 136 located within, or external to, the VPC 116.

In many instances a user of a resource provider environment 108 will want to specify various parameters of a resource instance to be provisioned in such an environment. A user, or a customer having an account with the resource provider, might utilize a management console 104 executing on, or accessible through, a client device 102 in order to specify various parameters for resource instances (physical or virtual) to be launched or provisioned in the resource provider environment 108. A user might specify values for parameters such as instance type, instance identifier, machine image, encryption, virtual name, snapshot identifier, and the like. Such a request may be received to an application programming interface (API) or other interface of an interface layer 110, then directed to a provisioning manager 112 that can utilize those parameter values to provision and/or launch those instances on behalf of the user.

A user may encounter various difficulties in provisioning using specified parameter values, as may be deemed appropriate or necessary for an application to be hosted using those resources. For example, a customer may not know which parameters need to be specified, or the possible or appropriate set of values for each parameter. Further, a customer may not know of various dependencies between parameters, such that while two parameter values might be independently valid, they are not valid together for a given instance. Using conventional approaches, a user could attempt to launch an instance using these values, but may not become aware that these parameter values are not optimal or appropriate until sometime later when an error occurs or is detected. In the meantime, the user has likely been charged for usage of those resources, and the user may have to provision new resources and start over with the hosting of the application, which can result in additional costs and resource consumption, as well as delays in obtaining application results or benefits.

Accordingly, approaches in accordance with various embodiments provide for a pre-validation of parameter values to be used in the provisioning or launching of electronic resources, such as virtual resource instances. In at least one embodiment, a pre-validation service 128 can perform a pre-validation of values that are to be used to provision one or more instances, such as for use to host or support an application on behalf of a user. In at least one embodiment, this pre-validation can be performed as part of an application launch wizard service that can provide a simple and intuitive way to deploy enterprise applications in the cloud, such as by using resources of the resource provider environment. Such a service can enable users to provision commonly-used enterprise applications, such as SQL Server from Microsoft Corporation, without the complexities of identifying and provisioning individual resources. In at least some embodiments, such a wizard can require users to only answer a few high-level questions about the application to be deployed, such as required performance characteristics, and the launch wizard service can take care of tasks such as identifying, provisioning, and configuring matching resources, such as compute instances and data storage volumes, to create a fully functioning application without requiring any specialized knowledge of those resources or the requirements of the resource provider environment.

In at least one embodiment, a launch wizard service can be provided using a modular system that defines any application as a collection of resources that can all be provisioned using one or more custom generated templates, and configured using an system management service, making possible to scale both in terms of number of applications and number of users. Such a service can provide an ability to be able to describe an application as collection of cloud resources or modules through a configuration file rather than the logic being spread across multiple packages and classes. Such a service can also provide the ability to generate a custom template, not only per application type, but per deployment. Such a template can be generated using generation logic that can depend on the application configuration mentioned above. Logic to generate template for a new application can reuse pre-existing modules that were written for previous applications. Such a service can also support a new application with minimal code change.

In at least one embodiment, a user can utilize the launch wizard service through the console 104 on the client device. As part of the wizard, the user can specify parameter values and then, before those resources are deployed, a pre-validation service can determine whether there are any errors or issues with those values. If so, an error message can be provided to the user through the application and console 104 so that the user can make the necessary changes before resources are deployed or charges for those resources accrued for the user. If the pre-validation is successful, then the resources can be provisioned and the application enabled to be hosted and executed as requested. As will be discussed in more detail later herein, a pre-validation service can perform tasks such as determining connectivity and credential accuracy for individual instances.

In at least one embodiment, the resources 126 to be allocated in a the VPC 116 may need to access external services 132 or resources 130 in the resource provider environment 108. In order to access these external services and resources, the resources 122, 126 in the VPC must have the appropriate permissions. Permissions in at least one embodiment are defined or controlled via one or more access policies. These access policies are typically associated with one or more roles that can be associated with a user account, with information for the roles being stored in a user account data store 114 or other such location. In at least one embodiment, a launch wizard service can also manage these roles on behalf of a user. For example, a validation service (or other such system or service) can determine the necessary permissions for an application to be executing using various resources, and determine the corresponding trust or access policies. The service can also determine a role that the user must have to be associated with these policies. If it is determined that the user has this role in the user account, then the process can continue as discussed above. If the role is not in the user account, the service can attempt to have the role added to the user account. This can include, for example, having a user provide access credentials (e.g., cloud administrator credentials) that the service can then use to create that role in the user account. If the user does not have permission or authorization to have that role created, then an error can be surfaced such that the user can either make adjustments to the requested deployment or can request changes to the user account that would allow such role creation. Once the role is in the user account and necessary permissions are verified, the provisioning of resources can commence.

In some instances, the user will request creation of a new virtual private cloud VPC, such that a pre-validation service may not be required as the VPC can be created with the appropriate permissions and configuration. It might be the case, however, that the user wants to utilize an existing VPC corresponding to a resource stack 206 in a user cloud account 202, as illustrated in the configuration 200 of FIG. 2. In this example, a user might use a cloud management console 104 executing on a client device 102 in a user cloud account 202 to access a launch wizard service. The user can interact with the screens displayed through the console 104, and information for the interaction can be sent to a launch wizard manager 210, as may comprise a launch wizard server in some embodiments. The user can, for example, provide various performance characteristics and information for an application to be deployed, which can then be sent to the launch wizard manager 210. The launch wizard manager 210 can determine whether pre-validation is required, as discussed elsewhere herein, and if so can send information for the deployment to a pre-validation engine 214. In this example, the pre-validation engine 214 (as may be part of a pre-validation service) can perform a pre-validation of the provided values before requesting a provisioning service 212 to provision those resources in the user cloud account 202. In at least one embodiment, this can include temporarily provisioning small instances and determining connectivity, such as to a network or a public subnet. If the pre-validation service fails then an error message can be surfaced through the console 104. If pre-validation service is successful then the provisioning service can be instructed to work with a cloud management service 204 in the user cloud account 202 to provision the resources in the user cloud account for the application. In this example, the resource stack 206 refers to all resources to be allocated by a resource provider in the user cloud account to host the target application. In at least some embodiments, the pre-validation engine can also (or alternatively) work with an account manager 216 to determine role information 218 for the customer, and can work with a policy manager 220 to determine which policies 222 are needed and ensure that the appropriate role is created or exists in the customer account. Once the appropriate role exists in the customer account, the provisioning service can use the appropriate instance creation templates 224 and libraries 226 to provision the various resources of the resource stack 206 in the customer account.

In one embodiment, the resource provider environment 108 can correspond to an Amazon Web Services (AWS) environment, where a user may be a customer having an AWS account. In such an implementation, the cloud management service 204 may comprise components such as AWS CloudFormation and AWS Systems Manager (SSM), which can use resource capacity from, for example, Amazon Simple Cloud Storage Service (S3) to provision resources for the resource stack 206 in the customer account. The templates 224 in such an implementation can then be CloudFormation templates, and the Launch Wizard Manager 210 can be an Amazon AppWizard manager.

FIG. 3 illustrates an example interface 300 of a launch wizard that can be displayed through a cloud resource management console in accordance with one embodiment. In this example, a user can specify an application 302 to be hosted using resources to be provisioned in a user account. As part of the wizard, the interface 300 can enable a user to specify values for various parameters 304 that can be used to provision those resources. The parameters listed are examples, as there can be various parameter values specified in various embodiments. Further, some of these parameter values may be specified by the system and not a user, among other such options. A user can specify target performance values, such as a number of input/output operations per second IOPS, and desired version information, such as an application version. The user can also specify network credentials and other such information. In this example, once completed the user can select from among various options 306, such as to select an option to move to a next interface page and step in the wizard process. In some embodiments, a user can instead provide values for parameters such as CPU memory, RAM size, desired number of CPUs, or expected performance, and the deployment service can determine appropriate resource sizing and selections using that information. The user can also be notified, before deploying the application, of the resources that will be deployed in their account, as well as the estimated cost.

Figure 4:
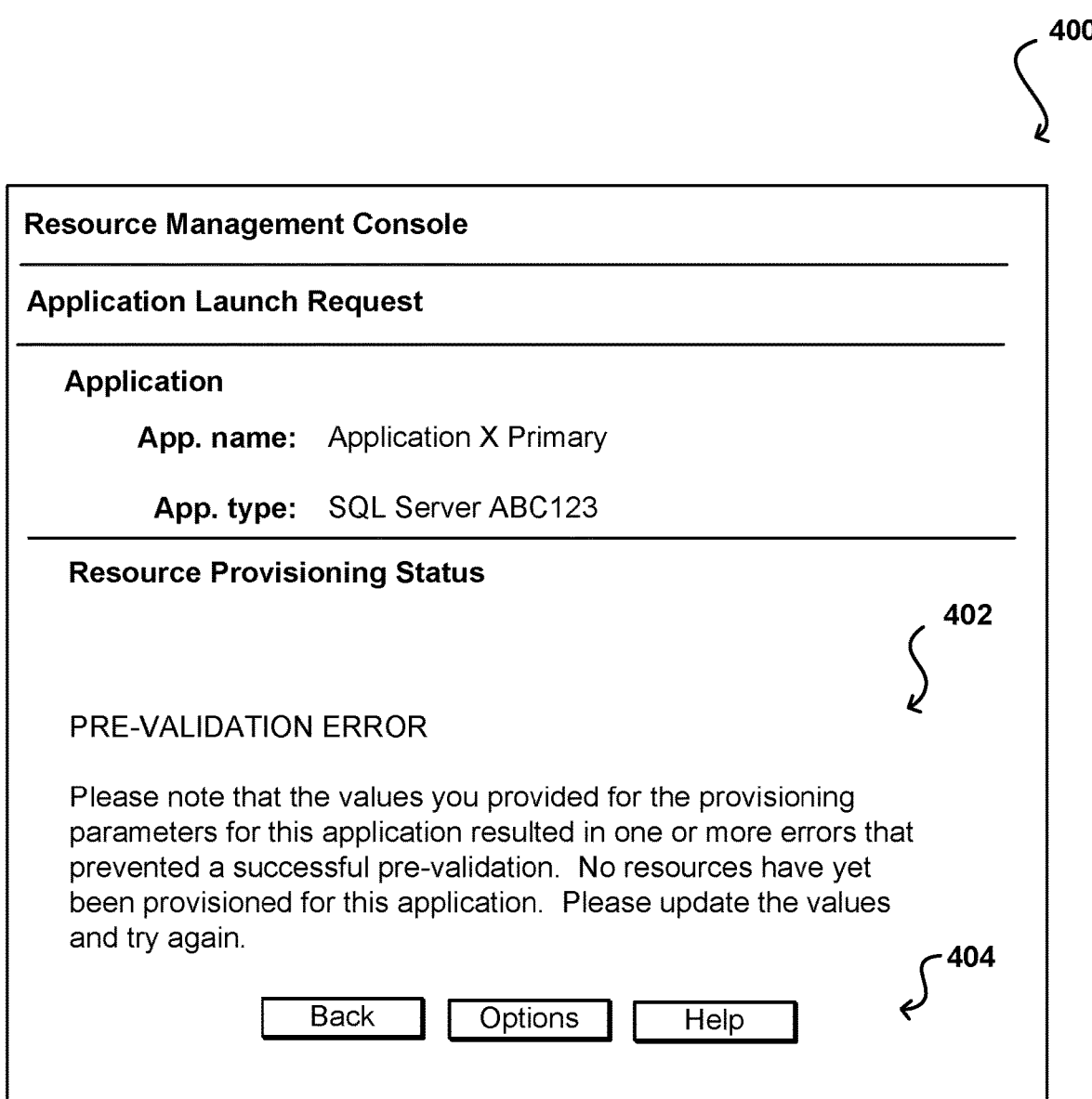
FIG. 4 illustrates an example notification that can be provided to a user in accordance with various embodiments.

Upon selecting an option such as "next," the wizard can perform one or more pre-provisioning tasks. This can include, for example, determining whether pre-validation should be performed, and if so then triggering the pre-validation service. This can also include ensuring the necessary permissions, such as by ensuring the appropriate role exists in the user account. If pre-validation is performed and successful, and the appropriate role is in the customer account, then the provisioning of the resources can commence. If pre-validation fails, however, then an interface page 400 can be provided for display through the console, as illustrated in FIG. 4. In this example, notification 402 of an error is provided after the pre-validation service has failed or otherwise completed or resulted in an error. Options 404 are also provided that can enable a user to go back to a prior interface page and make adjustments. In at least one embodiment only general error information is provided. In other embodiments information about the type of error may be provided, where available. In still other embodiments, suggestions for correcting the errors may be provided, and in some embodiments may be performed automatically for at least some types of errors.

In at least one embodiment, the launch wizard can utilize the provided information, as may relate to a number of cores needed or expected throughput, and match those requirements to suitable cloud resources available in the resource provider environment. The launch wizard can then provision those resources on behalf of the customer using appropriate cloud resource templates. Once the resources are deployed in the user account, the launch wizard can configure those resources using cloud management automation and provide the user with a ready-to-use application. In at least one embodiment, a launch wizard can also create a document that the user can use with existing scripts for repeatable future deployments.

In at least one embodiment, a user can utilize an interactive, card-based interface to configure the resources and parameters of an application. Once these cards are completed, a launch wizard can call a pre-validation service for the application and inform the customer of any issues that would prevent successful launch. These deployments can take hours, so having a fast fail mechanism can be very valuable in that it can save a user a lot of time, as well as the cost of provisioning resources for an application that would ultimately fail. Before resources are created, a validator can determined whether any limits would be reached. If so, the deployment is stopped before the resources are even created. If a user asks to use existing resources, the validator can determine whether these resources are sufficient to support the deployment.

In at least one embodiment, a user can choose to use an existing VPC, whereby the user can be responsible for providing (or specifying) a public subnet and one or more private subnets, such as one subnet for each resource instance (or node of the VPC). A user can also choose to use an existing active directory. In that case, the user can specify the domain user, as well as the password for that user. There can be certain permissions that the domain user needs to have in order to be able to perform the actions that to be taken on the active directory. For example, the domain user needs to have permissions to do domain joins in some embodiments, where a new instance is to be part of the active directory domain for the user. If a user selects a public subnet, a pre-validation service can determine outbound connectivity to, for example, the Internet. If a user selects a private subnet, the private subnet needs to have connectivity to a public subnet, as the instances may need to download certain drivers, automation scripts, or other information from the Internet, and the public subnet can act as a gateway to the Internet. In at least one embodiment, a pre-validation workflow can be executed on the server side that can create certain resources on the client side. In at least one embodiment, there can be an automation document for each validation that needs to be performed. This pre-validation workflow can upload the automation document on the user's account, and then it can start the automation. The automation in some embodiments can verify subnet connectivity to launch an instance. In some embodiments, a small instance can be launched in each subnet the user provided, both public and private. Checks can then be run for those instances to verify correct connectivity, correct active directory credentials, valid machine image, or other such aspects. In some embodiments a pre-validation check may be run to ensure that no limits are at risk of being reached, such as a limit on a number of concurrent instances or size of individual instances. In one example, a small instance is launched and an attempt is made to use the credentials that the user provided (e.g., username and password) to try to perform a domain join, or another such automation, to ensure that the user has the necessary permissions. If the validation passes, then the provisioning can begin.

Figure 5:
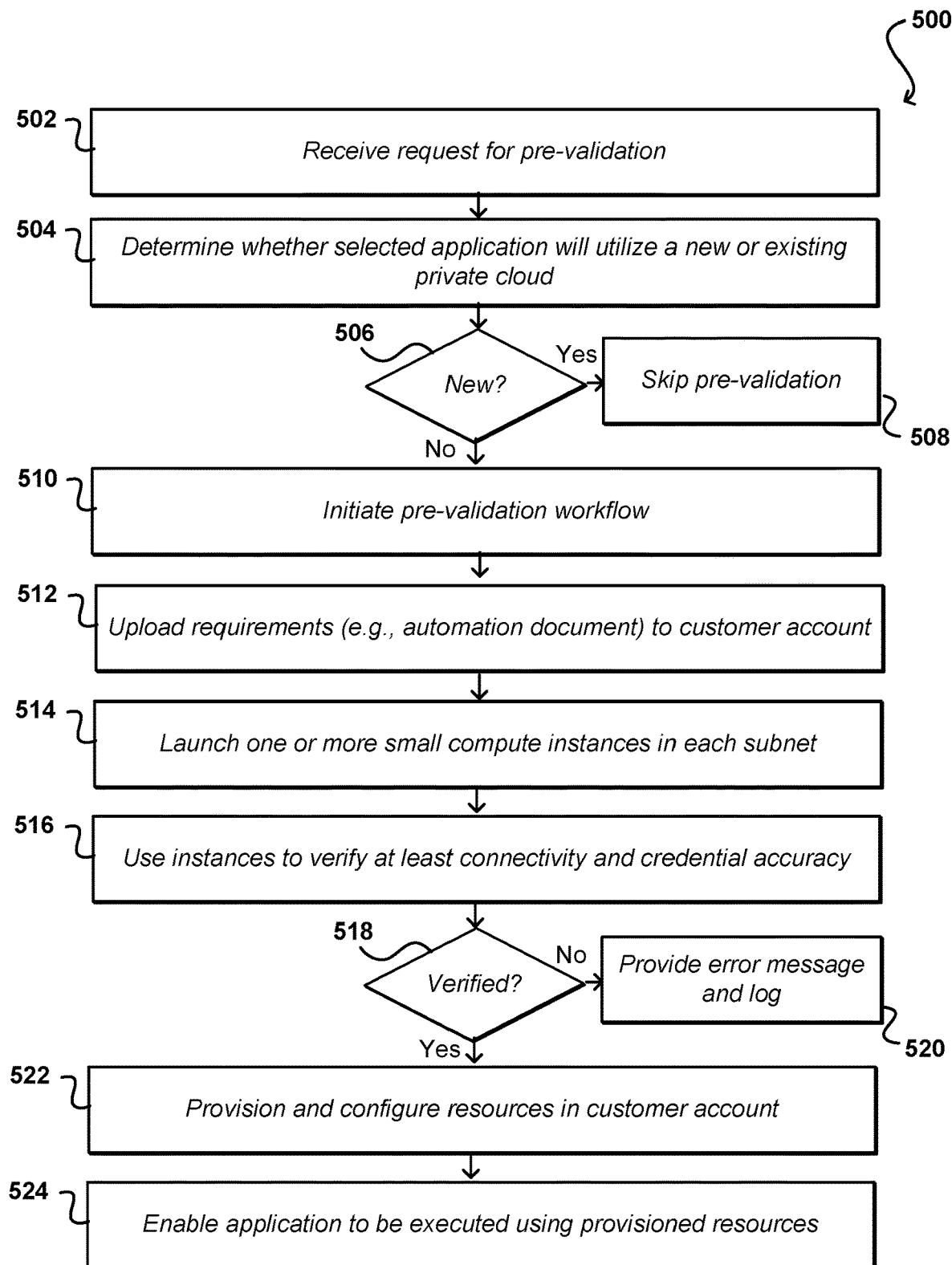
FIG. 5 illustrates an example process for performing pre-validation for an application that can be utilized in accordance with various embodiments.

FIG. 5 illustrates an example process 500 for performing pre-validation for a user application that can be utilized in accordance with various embodiments. It should be understood that there can be additional, fewer, or alternative steps performed in similar or alternative orders, or in parallel, within the scope of the various embodiments unless otherwise specifically stated. In this example, a request is received 502 to perform pre-validation. In some embodiments, this request may be received from a launch wizard in response to a user providing parameter values, such as desired performance characteristics for an application to be provided using the requested resources. The request may be received to a start provisioning API in some embodiments, which can call a pre-validation workflow. A determination can be made 504 as to whether the selected application will use a new or existing virtual private cloud (or other grouping of resources). If it is determined 506 that the application will use a new private cloud then pre-validation can be skipped 508 in this example, as the new cloud can be configured as needed.

If an existing private cloud is to be used, a pre-validation workflow can be initiated 510. In this example, a set of requirements (such as may be specified through at least one automation document) can be uploaded 512 to a customer (or other user) account. One or more small test instances (or otherwise less than full instances) can be launched 514 in each subnet of the private cloud. These small test instances can be used 516 to verify at least connectivity and credential accuracy, such as may be used to connect to a network or public subnet. In one example, a determination can be made as to whether the customer provided the correct credentials (e.g., username and password) for an active directory in the customer account. If aspects such as connectivity and credential accuracy are determined 518 to fail or otherwise cannot be verified, then an error message can be provided 520 through the console and the error can be logged for subsequent analysis. If the aspects can be verified then the corresponding resources can be provisioned 522 and configured in the customer account. The target application can then be enabled 524 to be hosted or executed using those target resources. In at least some embodiments, the pre-validation can occur unknown to the user unless an error occurs.

As mentioned, an application management service can, as part of the pre-validation or as a separate process, perform role management and verification for an application to be hosted using resources to be provisioned in a user account. In at least one embodiment, there can be various role creation mechanisms that enable this to be a semi-managed service. Typically, the infrastructure used to support an application is launched by a user into their own account, and then the user maintains this infrastructure, such as by applying security patches or operating system (OS) updates. A fully-managed service, such as Fargate from Amazon Web Services, Inc., can provision infrastructure in its own account, so that users does not see the underlying hosts supporting their applications or have to maintain these hosts. In at least one embodiment, this service is semi-managed in that it provisions resources the user needs on their behalf, but it does so in the user's own account so that they can manage the infrastructure going forward. In order to do this, a service in at least one embodiment creates a role in the user account to perform actions on behalf of the user. With respect to instances, the service may need to provision instances, download code from an appropriate location, and execute that code on those instances. It may then be necessary in some instances to create a role associated with these instances that will allow the instances to perform these actions. In at least one embodiment a role can be created in a user account that is associated with an appropriate trust policy. Such a trust policy can be a constrained policy that can only access certain buckets or storage locations, and has constraints on the actions it can perform.

Figure 6:
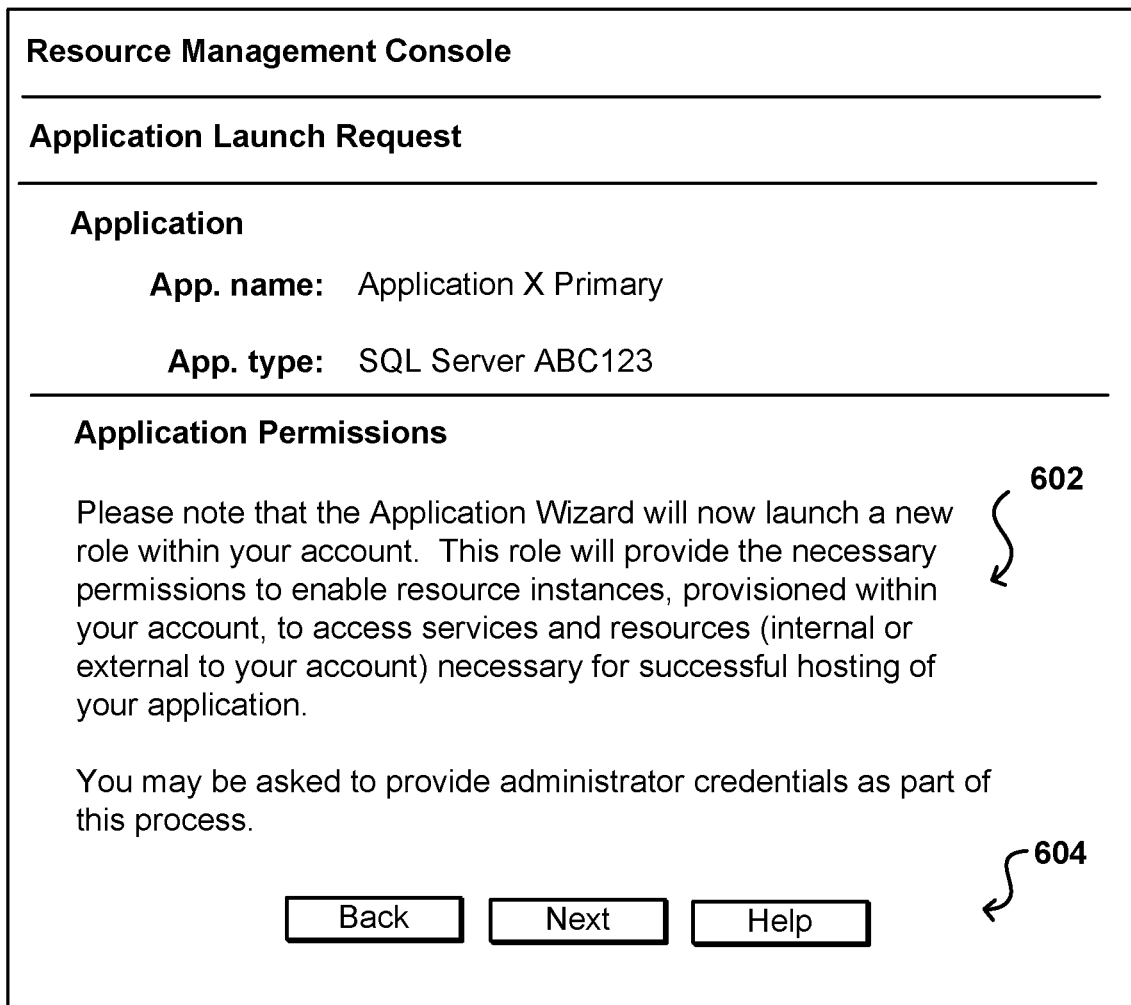
FIG. 6 illustrates an example console display that can be utilized in accordance with various embodiments.

From the perspective of the user, the user can come into the console and select the application. In at least one embodiment, the console can display a notification page 600 as illustrated in FIG. 6, which indicates that the service will create a role in the user account if the user decides to proceed. In situations where the role already exists in the user account, no such notification or interface page will be displayed. Other than this notification, the role can be created behind the scenes, such as by using appropriate identity management APIs and the role can later be attached to the user instances once provisioned.

As mentioned, in order to be able to perform tasks such as to configure the instances once deployed, the instances may need to access certain outside services and/or be able to download code or data from certain locations or addresses. In at least some embodiments, this can require the instances having the appropriate permissions to perform these tasks on behalf of the user. In at least one embodiment, a policy can be attached in the resource creation template. When a new resource is created using this template, it needs to then run with a certain role. If not already in the user account, this role may need to be created on behalf of the user. This role can have one or more attached policies that permit the instances to gain access to services mentioned in those policies. As mentioned, this role can be created directly in a user account in at least some embodiments. In some embodiments, the wizard will perform a check to determine whether the role exists, and if not then will kick off a role generation workflow.

Figure 7:
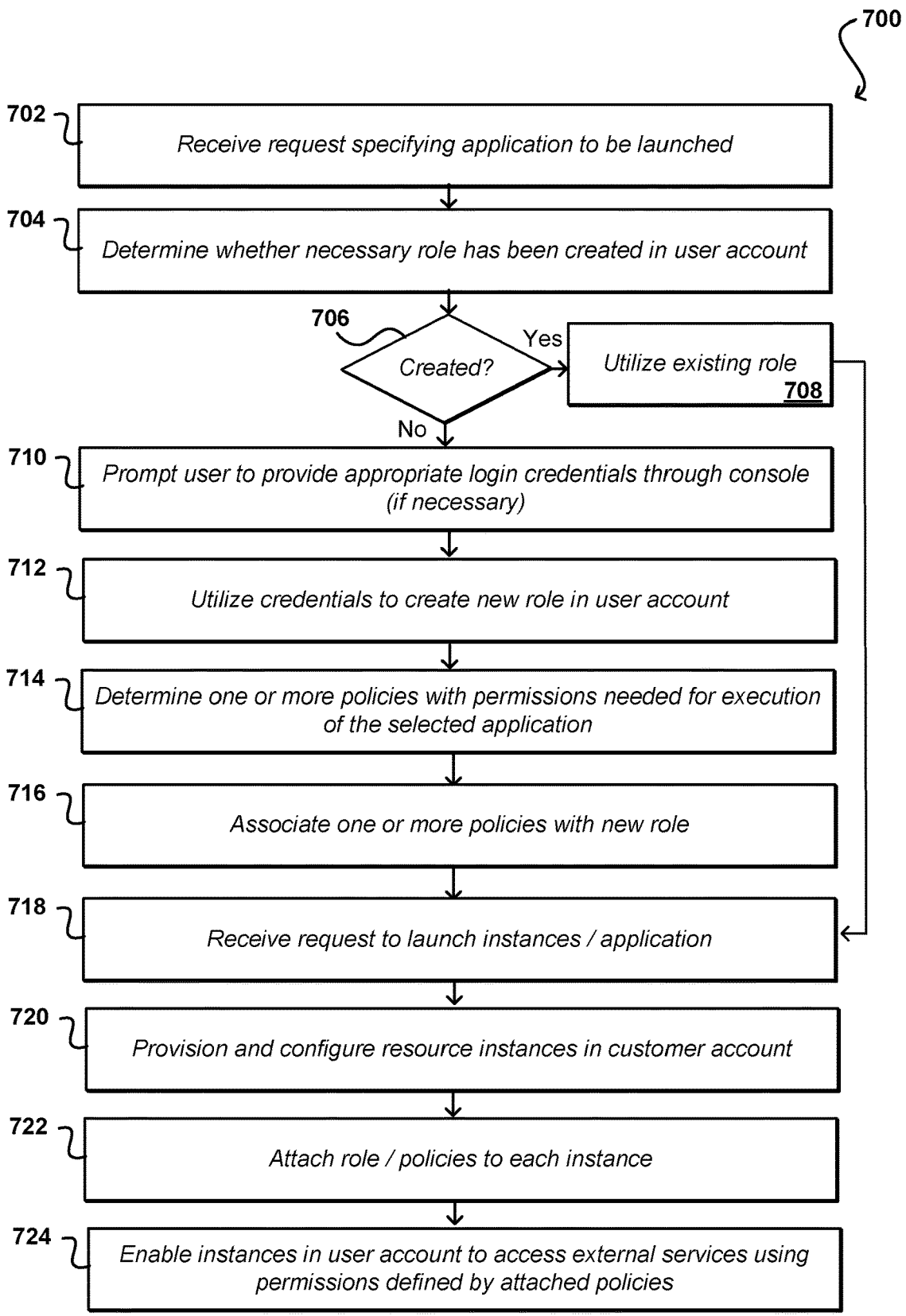
FIG. 7 illustrates an example process for managing a role and permissions needed for an application that can be utilized in accordance with various embodiments.

FIG. 7 illustrates an example process 700 for verifying permissions for an application deployment that can be utilized in accordance with various embodiments. In this example, a request is received 702 that specifies at least a user application, or application type, to be launched and hosted using, for example, resources of a resource provider. As mentioned, this request can be received from a launch wizard service in response to a user providing information for the deployment. A check can be performed to determine 704 whether a necessary role has been created, or otherwise already exists, in the user account that will provide the necessary permissions for the instances to support the application. If it is determined 706 that the role was previously created in the user account then this existing role can be utilized 708. If the role does not exist in the user account then the user can be prompted 710 to provide appropriate login credentials through the console, if needed, or can at least be notified that a new role is going to be created in the user account in this embodiment. The relevant user credentials can then be utilized 712 to create a new role in the user account. In at least one embodiment, it can be determined 714 which policies with permissions are needed for execution of the selected application, and if not already associated then these policies can be associated 716 with the new role. Through the launch wizard, for example, a request can be received 718 to launch instances and/or an application, where that request may specify one or more performance parameters as discussed herein. Once the new role is created in the customer account with the necessary policies and permissions, the resources can be provisioned 720 and configured in the customer account for hosting the specified application. The role and policies can then be attached 722 to each new instance in order to have the appropriate permissions to support the application. Those instances in the user account can then be enabled 724 to access external services and resources using permissions defined by the attached policies.

As mentioned, in at least some embodiments this functionality can be provided as part of a launch wizard or deployment service. In at least some embodiments, such a service can enable a user to select from a catalog of applications, and provide specifications for their application through the wizard. A user can specify tags for their resources prior to provisioning, and view an estimated cost of deploying the application resources. The user can review the deployment before actually choosing to deploy, and can see a list of previous active deployments. Through a console, such a service can also enable a user to delete an application and all its associated data, as well as to debug a failure directly through the console or reuse an application deployment to start more deployments.

In at least one embodiment, such a system can include a workload provisioning service that can serve requests directly from the management console. This service can provide a set of APIs for supporting console functionality and passing the required parameters to, and from, console. A workload provisioning engine can supports all the asynchronous work through a set of workflows. A workload provisioning configuration provider can be used to translate an application definition, as may be stored as YAML configuration, into plain old Java objects (POJOs) reusable across the system. A workload provisioning cloud generator can contain reusable modules and building blocks to generate a collection of resource formation templates for the resource stack in the user account.

In at least one embodiment, a provisioning workflow can obtain the appropriate application configuration and obtain user specifications for the application deployment. A workload provisioning cloud generator can be used to create an application, and for every module in the application configuration file, can add a nested stack in the main application stack. The template can then be uploaded and validated, and the appropriate cloud management service documents stored to the user account. The cloud service management automation execution can be started, wherein the cloud management service begins the provisioning by creating a stack from the template in user account. A track provisioning events workflow can be initiated, that can obtain all the previous tracked events and application status. Based on current status, it can obtain all possible events from the cloud management service, and can obtain the most recent log data. The workflow can synchronize previously-tracked events with the newly found list, and can update data with the latest events and status of previously-tracked events. Provisioning status can also be updated as appropriate. If provisioning succeeds or fails, a notification can be provided for the user. Once usage of an application is completed, a deletion workflow can be initiated that can trigger deletion of the resource stack, as well as artifacts outside the stack, such as a parameter-secure string for storing passwords. A track provisioning events workflow can then be triggered for deletion.

Figure 8:
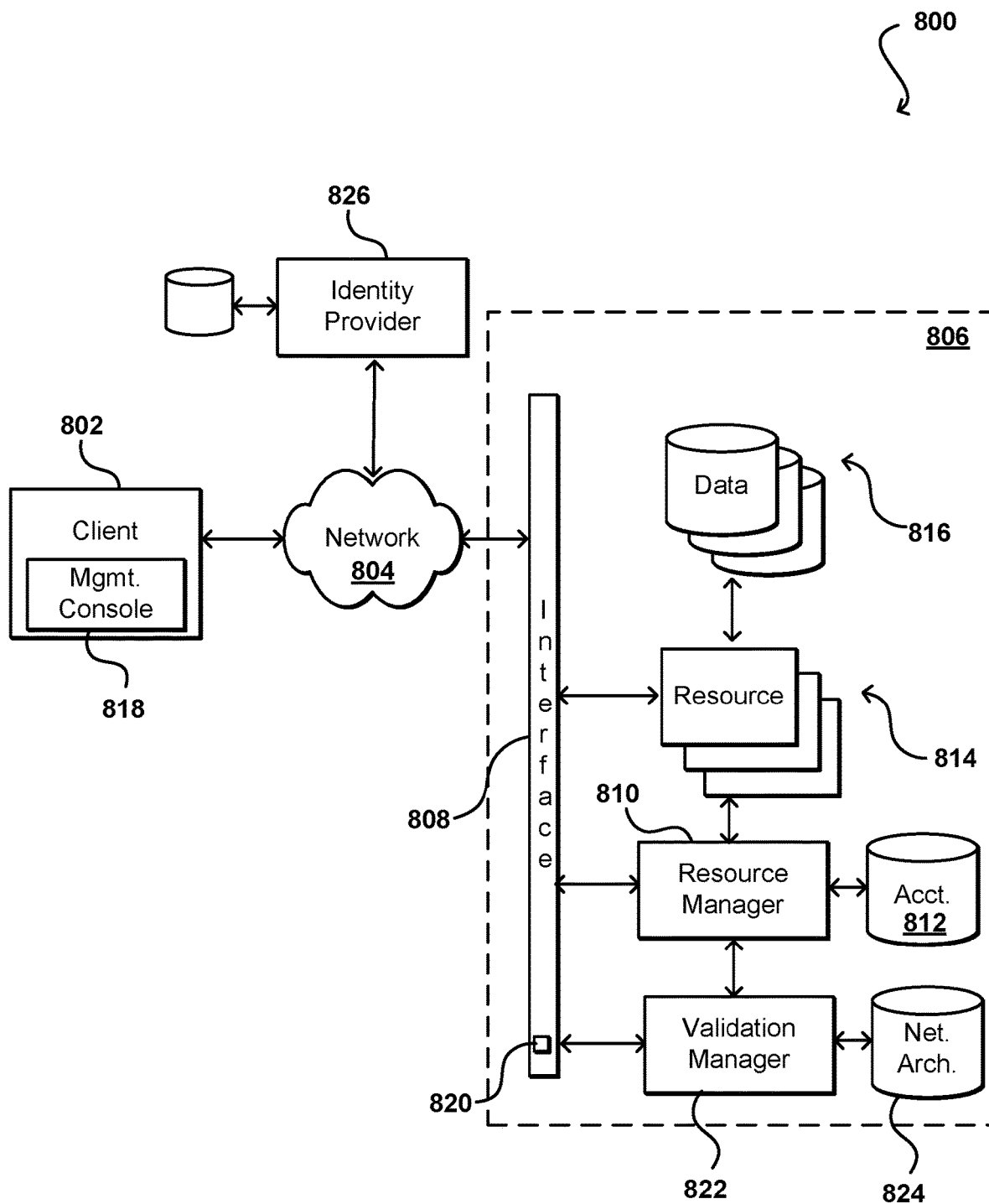
FIG. 8 illustrates an example environment in which aspects of various embodiments can be implemented.

FIG. 8 illustrates components of an example cloud computing environment 800 in which aspects of various embodiments can be implemented. In at least some embodiments, a user wanting to utilize a portion of the resources 814 can submit a request that is received to an interface layer 808 of the provider environment 806. The interface layer can include application programming interfaces (APIs) or other exposed interfaces enabling a user to submit requests to the provider environment. The interface layer 808 in this example can also include other components as well, such as at least one Web server, routing components, load balancers, and the like. When a request to provision a resource is received to the interface layer 808, information for the request can be directed to a resource manager 810 or other such system, service, or component configured to manage user accounts and information, resource provisioning and usage, and other such aspects. A resource manager 810 receiving the request can perform tasks such as to authenticate an identity of the user submitting the request, as well as to determine whether that user has an existing account with the resource provider, where the account data may be stored in at least one data store 812 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 818, a key management service, a corporate entity, a certificate authority, an identify broker, and the like. In some embodiments, a user can provide information useful in obtaining the credentials, such as user identity, account information, password, user-specific cryptographic key, customer number, and the like. The identity provider can provide the credentials to the resource provider environment 806 and/or to the client device 802, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 802 to communicate with an allocated resource without having to communicate with the resource manager 810, at least until such time as a relevant aspect of the user account changes, the user is no longer granted access to the resource, or another such aspect changes.

The resource manager 810 (or another such system or service) in this example can also function as a virtual layer of hardware and software components that handles control functions in addition to management actions, as may include provisioning, scaling, replication, etc. The resource manager 810 can utilize dedicated APIs 820 in the interface layer 808, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 808 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service.

Figure 9:
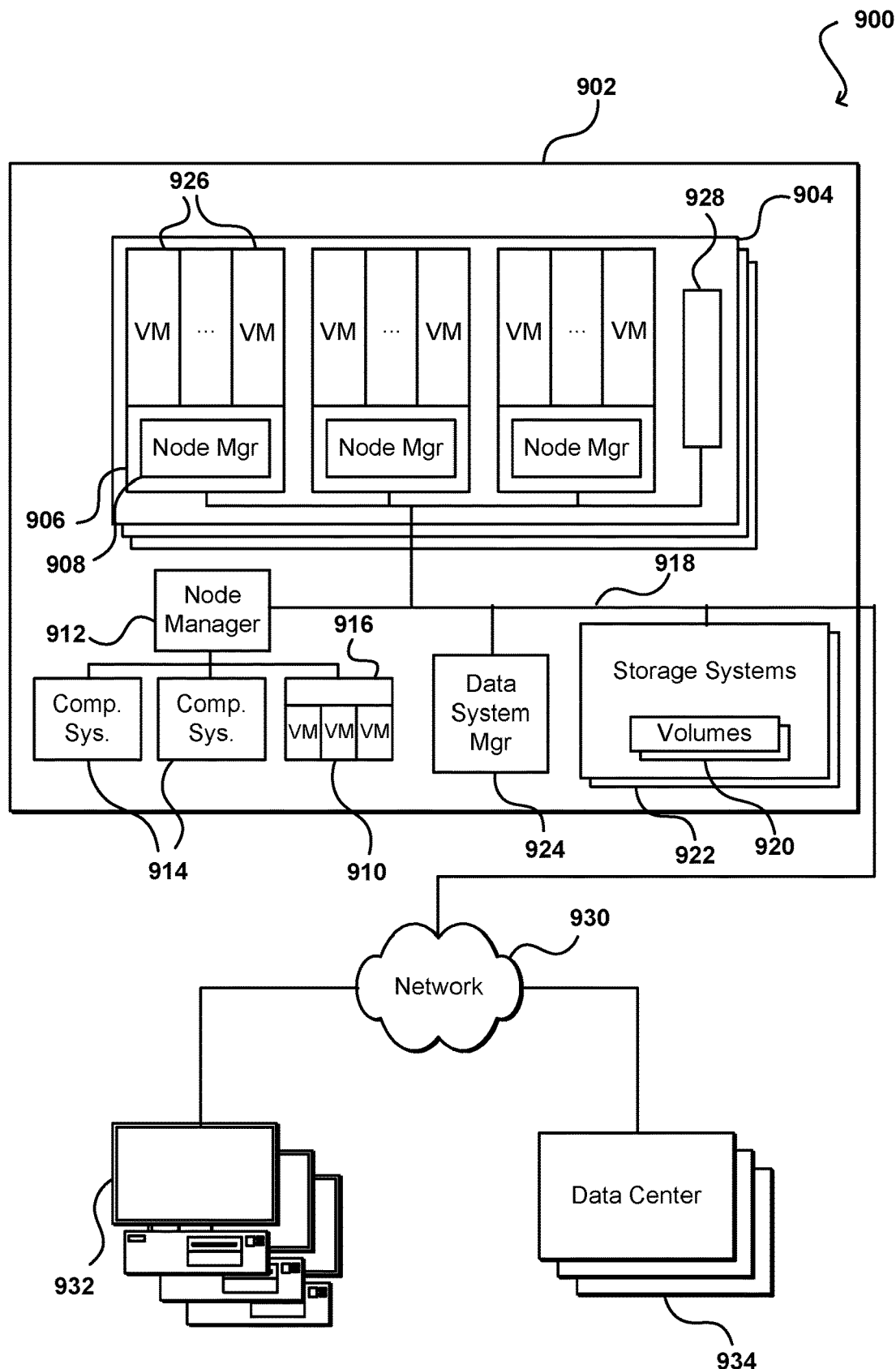
FIG. 9 illustrates components of an example data center that can be utilized in accordance with various embodiments.

FIG. 9 illustrates an example network configuration 900 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 902 includes a number of racks 904, each rack including a number of host computing devices 906, as well as an optional rack support computing system 928 in this example embodiment. The host computing systems 906 on the illustrated rack 904 each host one or more virtual machines 926 in this example, as well as a distinct node manager module 912 associated with the virtual machines on that host computing system to manage those virtual machines. One or more other host computing systems 916 may also each host one or more virtual machines 910 in this example. Each virtual machine 910 may act as an independent resource node for executing one or more program copies or performing another such action or process for user data requests, I/O operations, etc. In addition, this example data center 902 further includes additional host computing systems 914 that do not include distinct virtual machines, but may nonetheless each act as a resource node for one or more tasks being executed for a user. In this example, a node manager module 912 executing on a computing system (not shown) distinct from the host computing systems 914 and 916 is associated with those host computing systems to manage the resource nodes provided by those host computing systems, such as in a manner similar to the node manager modules 908 for the host computing systems 906. The rack support computing system 928 may provide various utility services for other computing systems local to its rack 904 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 902 also includes a computing system 924 that executes a data storage system manager module for the block-based data storage service to assist in managing the availability of non-local block-based data storage to programs executing on resource nodes provided by the host computing systems located within the data center (or optionally on computing systems located in one or more other data centers 934, or other remote computing systems 932 external to the data center). In particular, in this example the data center 902 includes a pool of multiple block-based data storage systems 922, which each have local block-based storage for use in storing one or more volume copies 920. Access to the volume copies 920 is provided over the internal network(s) 918 to programs executing on various resource nodes 910 and 914. As discussed in greater detail elsewhere, a block-based data storage system manager module 924 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the system manager module 922 may coordinate with the node manager modules 912, 908 to manage use of volumes by programs executing on associated resource nodes, while in other embodiments the node manager modules may not be used to manage such volume use. In addition, in other embodiments, one or more system manager modules 924 may be structured in other manners, such as to have multiple instances of the system manager executing in a single data center (e.g., to share the management of non-local block data storage by programs executing on the resource nodes provided by the host computing systems located within the data center), and/or such as to have at least some of the functionality of a system manager module being provided in a distributed manner by software executing on some or all of the server block data storage systems 922 (e.g., in a peer-to-peer manner, without any separate centralized system manager module on a computing system 924).

In this example, the various host computing systems, server block data storage systems, and computing systems are interconnected via one or more internal networks 918 of the data center, which may include various networking devices (e.g., routers, switches, gateways, etc.) that are not shown. In addition, the internal networks 918 are connected to an external network 930 (e.g., the Internet or another public data network) in this example, and the data center 902 may further include one or more optional devices (not shown) at the interconnect between the data center and an external network (e.g., network proxies, load balancers, network address translation devices, etc.). In this example, the data center 902 is connected via the external network 930 to one or more other data centers 934 that each may include some or all of the computing systems and storage systems illustrated with respect to data center 902, as well as other remote computing systems 932 external to the data center. The other computing systems 932 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems may further be interconnected with one or more other networks or other connection mediums, such as a high-bandwidth connection over which the storage systems may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 9 has been simplified for the purposes of explanation, and that the number and organization of host computing systems, server block data storage systems and other devices may be much larger than what is depicted in FIG. 9. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, a data center may execute tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 9 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 9, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

Figure 10:
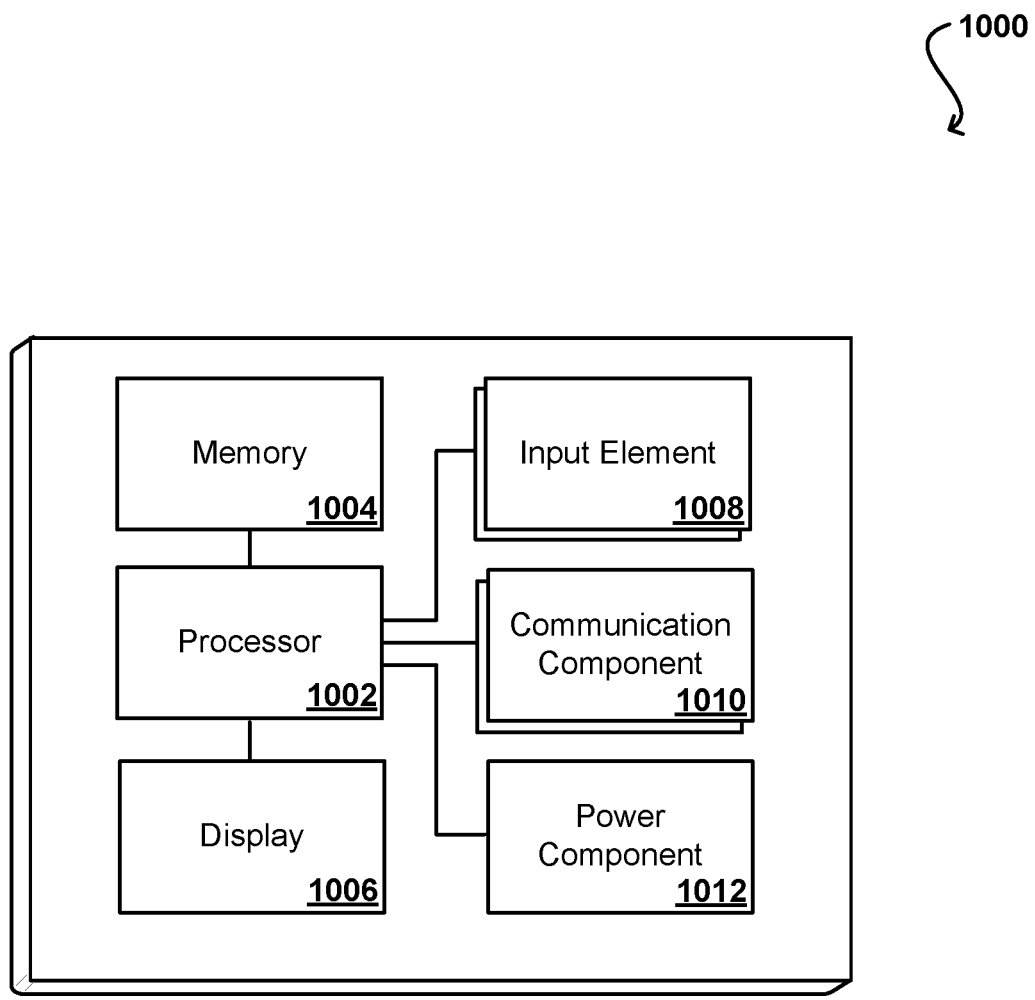
FIG. 10 illustrates components of an example computing device that can be used to perform aspects of the various embodiments.

FIG. 10 illustrates a logical arrangement of a set of general components of an example computing device 1000. In this example, the device includes a processor 1002 for executing instructions that can be stored in a memory device or element 1004. As would be apparent to one of ordinary skill in the art, the device can include many types of memory, data storage, or non-transitory computer-readable storage media, such as a first data storage for program instructions for execution by the processor 1002, a separate storage for images or data, a removable memory for sharing information with other devices, etc. The device typically will include some type of display element 1006, such as a touch screen or liquid crystal display (LCD), although devices such as portable media players might convey information via other means, such as through audio speakers. As discussed, the device in many embodiments will include at least one input element 1008 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 1000 of FIG. 10 can include one or more network interface or communication elements or components 1010 for communicating over various networks, such as a Wi-Fi, Bluetooth, RF, wired, or wireless communication systems. The device in many embodiments can communicate with a network, such as the Internet, and may be able to communicate with other such devices. The device will also include one or more power components 1012, such as power cords, power ports, batteries, wirelessly powered or rechargeable receivers, and the like.

Example environments discussed herein for implementing aspects in accordance with various embodiments are primarily Web-based, as relate to Web services and cloud computing environments, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving, through a management console of a launch wizard of a cloud computing network, selection of an application to be hosted using a plurality of resource instances of the cloud computing network that are to be provisioned in a user account;
determining a set of permissions for the plurality of resource instances to host the application;
determining that a role, having one or more policies attached that provide the set of permissions, does not exist in the customer account;
obtaining credentials associated with the user account;
creating, using the credentials, the role in the user account;
provisioning, after creating the role in the user account, the plurality of resource instances in the user account for hosting the application; and
attaching the role to the plurality of resource instances after the provisioning, wherein the plurality of instances have the determined set of permissions.

2. The computer-implemented method of claim 1, wherein the determining of the set of permissions is initiated by a launch wizard used to receive the performance requirements through the management console and trigger the provisioning of the plurality of resource instances.

3. The computer-implemented method of claim 1, further comprising:
returning an error message through the management console if the role is unable to be created in the user account, wherein the plurality of resources are not deployed until the role is created successfully.

4. The computer-implemented method of claim 1, wherein a user is able to manage the plurality of resource instances once provisioned in the user account.

5. The computer-implemented method of claim 1, wherein the plurality of resource instances are to be provisioned in a virtual private cloud (VPC) in the user account, and wherein the set of permissions enable the plurality of resource instances to access services and resources via the VPC.

6. A computer-implemented method, comprising:
receiving, through a management console, selection of an application to be hosted using a plurality of resources to be provisioned in a user account;
creating a role, in the user account, that is associated with one or more policies providing a set of permissions for hosting the application;
provisioning, after creating the role in the user account, the plurality of resources in the user account for hosting the application; and
attaching the role to the plurality of resources, wherein the plurality of resources have the determined set of permissions.

7. The computer-implemented method of claim 6, further comprising:
determining that the role, associated with the one or more policies, does not exist in the customer account; and
obtaining credentials associated with the user account for use in creating the role.

8. The computer-implemented method of claim 6, wherein the creating of the role is initiated by a launch wizard used to receive the set of parameter values through the management console and trigger the provisioning of the plurality of resources.

9. The computer-implemented method of claim 6, wherein the plurality of resources are to be provisioned in a virtual private cloud (VPC) in the user account, and wherein the set of permissions enable the plurality of resources to access services and resources external to the VPC.

10. The computer-implemented method of claim 9, wherein the plurality of resources are able to utilize the set of permissions to download code or data from the services and resources via the VPC.

11. The computer-implemented method of claim 6, wherein a user is able to manage the plurality of resources once provisioned in the user account.

12. The computer-implemented method of claim 6, further comprising:
providing, through the management console, a notification that the role is to be created before creating the role in the user account.

13. The computer-implemented method of claim 6, further comprising:
calling an identity management application programming interface (API) to create the role in the user account.

14. The computer-implemented method of claim 6, wherein the role is associated with one or more templates used to provision the plurality of resources.

15. The computer-implemented method of claim 6, wherein the plurality of resources includes at least one compute resource, storage resource, or networking resource.

16. A system, comprising:
at least one processor; and
memory including instructions that, upon being executed by the at least one processor, cause the system to:
receive, through a management console, selection of an application to be hosted using a plurality of resources to be provisioned in a user account;
create a role, in the user account, that is associated with one or more policies providing a set of permissions for hosting the application;
provision, after creating the role in the user account, the plurality of resources in the user account for hosting the application; and
attach the role to the plurality of resources, wherein the plurality of resources have the determined set of permissions.

17. The system of claim 16, wherein the instructions when executed further cause the system to:
  determine that the role, associated with the one or more policies, does not exist in the customer account; and
  obtain credentials associated with the user account for use in creating the role.

18. The system of claim 16, wherein the creating of the role is initiated by a launch wizard used to receive the set of parameter values through the management console and trigger the provisioning of the plurality of resources.

19. The system of claim 16, wherein the plurality of resources are to be provisioned in a virtual private cloud (VPC) in the user account, and wherein the set of permissions enable the plurality of resources to access services and resources via the VPC.

20. The system of claim 19, wherein the plurality of resources are able to utilize the set of permissions to download code or data from the services and resources via the VPC.

* * * * *